United States Patent [19]

Tam

[11] Patent Number: 5,568,510
[45] Date of Patent: *Oct. 22, 1996

[54] APPARATUS AND METHOD FOR OBTAINING SYNCHRONISM BETWEEN A BASE STATION AND A PORTABLE UNIT ARRANGED FOR OPERATION IN A FREQUENCY HOPPING SYSTEM

[75] Inventor: Herbert W. Tam, Edison, N.J.

[73] Assignee: AT&T IPM Corp., Coral Gables, Fla.

[ * ] Notice: The term of this patent shall not extend beyond the expiration date of Pat. No. 5,353,341.

[21] Appl. No.: 312,595

[22] Filed: Sep. 27, 1994

[51] Int. Cl.$^6$ .............................. H04B 15/00; H04K 1/00
[52] U.S. Cl. ............................................. 375/202; 371/32
[58] Field of Search ................................. 375/202, 200, 375/201; 369/61, 59; 455/54.1, 56.1, 57.1; 371/32, 33, 34

[56] References Cited

U.S. PATENT DOCUMENTS 5,353,341 10/1994 Gillis ........................................ 379/61
5,353,447 10/1994 Gillis ........................................ 379/61

OTHER PUBLICATIONS

U.S. Patent Application Serial No. 07/779754, filed on Oct. 21, 1991. Inventors: M. E. Gillis et al.

Primary Examiner—Young T. Tse
Assistant Examiner—Bryan Webster
Attorney, Agent, or Firm—Samuel R. Williamson

[57] ABSTRACT

A cordless telephone arranged for operation in a frequency hopping system quickly establishes communications between a base unit and an associated handset unit in the telephone. Synchronization between the base unit and the handset unit is achieved through a process in which first the base unit sends a start hopping message contiguously for a specific number of frames or time slots. The handset unit, in turn, responds by sending a staff hopping acknowledge message to the base unit in a frame each time it receives the start hopping message in a frame. In response to the handset unit sending the start hopping acknowledge message, the base unit sends to the handset unit an acknowledge hopping message, also for a specific number of frames. If either the base unit or handset unit fails to receive a message in a specific frame, the synchronization process advantageously continues since each one of the messages contained in the specific number of frames linearly decreases in value with each succeeding frame. Both the base unit and handset unit are thus able to predict the value for each message not received in one or more specific frames. Upon receipt of the acknowledge hopping message by the handset unit from the base unit in at least one frame, therefore, both the base unit and the handset unit are synchronized and will begin frequency hopping when the value for this message linearly decreases in time to a predetermined value. Should ongoing communications between the base unit and the handset unit be inadvertently interrupted, the cordless telephone quickly reestablishes communications in the frequency hopping system through this same synchronization process.

40 Claims, 5 Drawing Sheets

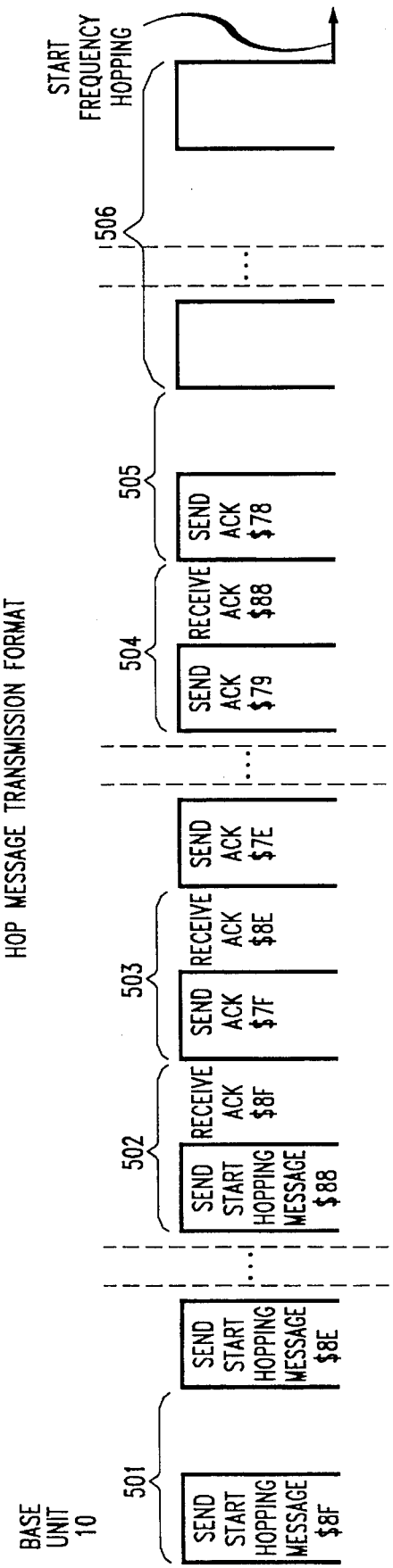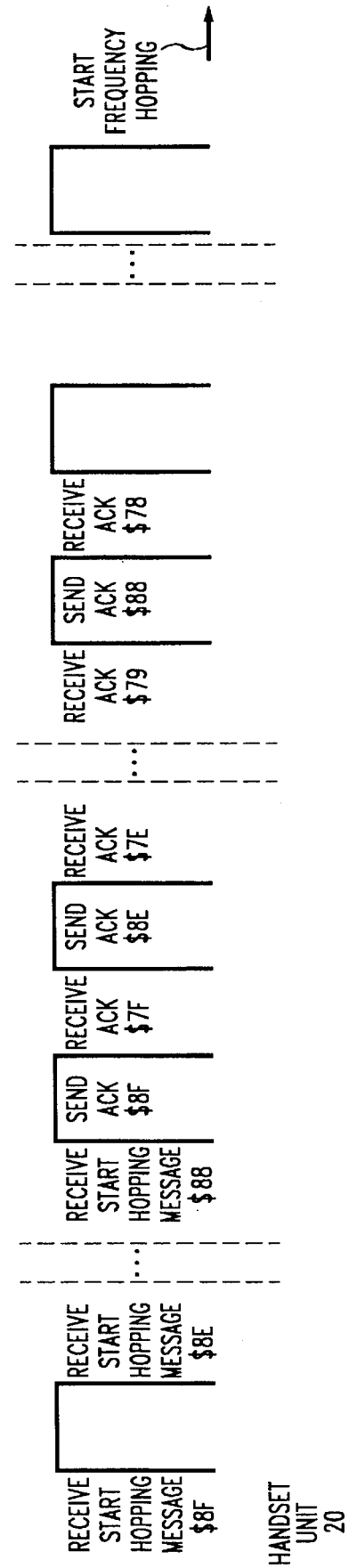
FIG. 5
HOP MESSAGE TRANSMISSION FORMAT

5,568,510

APPARATUS AND METHOD FOR OBTAINING SYNCHRONISM BETWEEN A BASE STATION AND A PORTABLE UNIT ARRANGED FOR OPERATION IN A FREQUENCY HOPPING SYSTEM

BACKGROUND OF THE INVENTION

1. Technical Field

This invention relates to cordless telephones and more particularly to an apparatus and method employed in a cordless telephone for initiating synchronous frequency hopping for communicating in a frequency hopping system.

2. Description of the Prior Art

Recent rulings promulgated by the Federal Communication Commission (FCC) in the utilization of spread spectrum systems, including a frequency hopping system, now allow for increased spectral utilization for cordless telephones. Frequency hopping systems spread theft energy by changing, or hopping, the center frequency of the transmission many times a second in accordance with a pseudo-randomly generated list of communication channels. The result is a significantly higher signal-to-noise ratio than may be achieved by conventional techniques, such as amplitude modulation which uses no bandwidth spreading.

Cordless telephones designed to operate in a frequency hopping system have now become available. One example of such a cordless telephone has been designed in accordance with the teachings of U.S. Pat. No. 5,323,447 which issued on Jun. 21, 1994 and also U.S. Pat. No. 5,353,341, which issued on Oct. 4, 1994. Both the patent and patent application are incorporated herein by reference.

The cordless telephone disclosed in U.S. Pat. No. 5,353,341 conserves battery power in a handset unit when this unit is located remote from an associated base unit and configured in a standby state. While configured in the standby state, the handset unit resides in a low-power monitoring mode which includes deactivating certain internal circuitry and reducing the on-time state of other internal circuitry for conserving battery power.

While configured in the standby state, the cordless telephone must be able to quickly respond to the base unit and also initialize its frequency hopping with the base unit. This involves reconfiguring the handset unit from the standby state to a full ON operating state and also having both units execute an initialization process during which the frequency hopping between these units is synchronized. Should ongoing communications between the base unit and the handset unit be inadvertently interrupted, the initialization process is also executed at this time.

The initialization process disclosed in U.S. Pat. No. 5,353,341 includes performing in order: 1) the base unit sending one in a series of start hopping messages and the handset unit receiving this message; 2) the handset unit replying to the base unit by sending one in a series of first acknowledge messages in response to receipt of the start hopping message; and 3) the base unit replying to the handset unit by sending one in a series of second acknowledge messages acknowledging receipt by the base unit of the first acknowledge message from the handset unit. Each message (start hopping message, first acknowledge message and second acknowledge message) from each of the series of three messages is transmitted in the designated sequential order from the base unit or the handset unit, as just described. Once the transmission of the series of messages is completed, synchronous frequency hopping between the handset unit and base unit begins. In obtaining synchronization by this process, a delay, typically six to eight transmission frames or time periods, in both the base unit and the handset unit is incurred before the appropriate acknowledge signal is received. Such delay is incurred each time the base unit sends a start hopping message from the series of start hopping messages. Thus, the processing time in the handset unit and base unit is not fully optimal, since each has to wait for receipt of the acknowledge signal from the other unit. Additionally, this increases the time for the two units to begin frequency hopping.

Although the described initialization process is effective in establishing and reestablishing communications between the base unit and the handset unit, it does not quickly obtain synchronization between the base unit and the handset unit. Fast synchronization is desirable to minimize the time encountered by a user of the cordless telephone while waiting for these units to establish communications or, as necessary, reestablish communications.

SUMMARY OF THE INVENTION

In accordance with the invention, a cordless telephone arranged for operation in a frequency hopping system quickly establishes communications between a base unit and an associated handset unit in the telephone. Synchronization between the base unit and the handset unit is achieved by first having the base unit send a start hopping message or opcode contiguously for a specific number of frames or time slots. The handset unit, in turn, responds by sending a start hopping acknowledge message to the base unit in a frame each time it receives the start hopping message in a frame.

In accordance with a first aspect of the invention, the start hopping message transmitted by the base unit is immediately followed by the base unit sending an acknowledge hopping message to the handset unit for a specific number of frames. If the base unit contiguously receives the start hopping acknowledge message in each frame, it, in turn, sends the acknowledge hopping message contiguously in each one of corresponding frames. If the base unit does not receive the start hopping acknowledge message from the handset unit in a frame, however, it similarly does not respond to the handset unit in a corresponding frame with its acknowledge hopping message.

In accordance with a second aspect of the invention, if either the base unit or handset unit fails to receive a message in a specific frame, the synchronization operation advantageously continues since each one of the messages contained in the specific number of frames linearly decreases in value with each succeeding frame. Both the base unit and handset unit are thus able to predict the value for each message not received in one or more specific frames. Upon receipt of the acknowledge hopping message by the handset unit from the base unit in at least one frame, therefore, both the base unit and the handset unit are synchronized and can begin frequency hopping when the value for this message linearly decreases in time to a predetermined value.

BRIEF DESCRIPTION OF THE DRAWINGS

The invention and its mode of operation will be more clearly understood from the following detailed description when read with the appended drawing in which:

FIG. 5 shows a hop message transmission format suitable for incorporating into the cordless telephone of FIG. 1 in accordance with the invention.

Throughout the drawing, the same element when shown in more that one figure is designated by the same reference numeral.

The initialization process includes: 1) the base unit sending a first one in a series of start hopping messages and the handset unit receiving this first message; 2) the handset unit replying to the base unit by sending a first one in a series of first acknowledge messages in response to receipt of the first start hopping message; and 3) the base unit replying to the handset unit by sending a first one in a series of second acknowledge messages acknowledging receipt by the handset unit (via the first acknowledge message) of the start hopping message.

DETAILED DESCRIPTION

Figure 1:
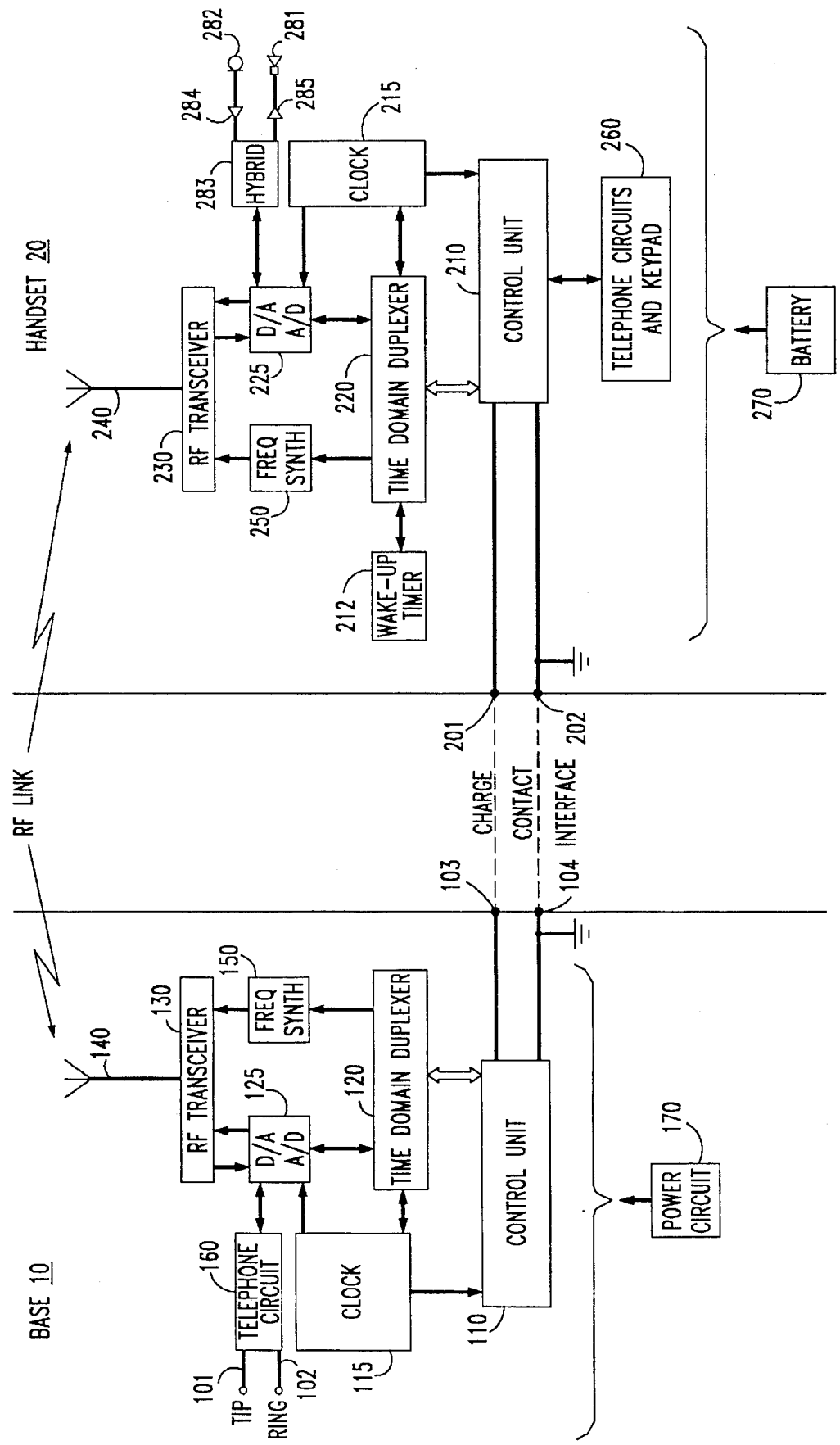
FIG. 1 is a functional block representation of a cordless telephone base unit and handset unit both operative in accordance with the principles of the present invention.

Referring now to FIG. 1 of the drawing, there is shown a general block diagram of certain circuitry of a cordless telephone that provides increased functionality and incorporates a power conserving arrangement for the handset unit operative in accordance with the principles of the present invention. As shown, the cordless telephone generally comprises a base unit 10 and a handset unit 20 which are both operable over a plurality of communication channels in a frequency hopping system.

A general overview of spread spectrum technology including frequency hopping systems is provided by R. C. Dixon, *Spread Spectrum Systems,* New York: John Wiley & Sons, 1984. The specific requirements for the frequency hopping system in which this cordless telephone is designed to operate are set forth in a Report and Order in General Docket No. 89-354, this Report and Order being adopted by the Federal Communications Commission on Jun. 14, 1990 and released on Jul. 9, 1990.

Included in the base unit 10 are a control unit 110 and a clock 115 for providing synchronization to: 1) the control unit 110, 2) a time domain duplexer (TDD) 120, and 3) a combined digital-to-analog and analog-to-digital (D/A+A/D) converter 125. Also included in the base unit 10 are a radio frequency (RF) transceiver 130, an antenna 140, and a frequency synthesizer 150. A telephone circuit 160 in the base unit 10 connects this unit to a central office or other appropriate switch through tip-and-ring lines 101 and 102. The transceiver 130 comprise both an RF transmitter and an RF receiver. The transceiver 130 demodulates voice signals transmitted by the handset unit 20 and couples these signals via the D/A section of converter 125 to the telephone circuit 160. The transceiver 130 also has as its input speech and other control signals from the telephone circuit 160 which are first coupled through the A/D section of converter 125 before being transmitted to the handset unit 20 by this transceiver 130. The telephone circuit 160 serves as a "plain old telephone service" (POTS) interface for signals on the tip-and-ring lines 101 and 102 and for those signals received from the handset unit 20 by the RF transceiver 130. Finally, a power circuit 170 provides operating power for all of the circuitry in the base unit 10.

The control unit 110 advantageously provides a number of control functions and may be implemented through the use of a microcomputer containing read-only memory (ROM), random-access memory (RAM) and through use of the proper coding. Such a microcomputer is known in the art and is readily available from semiconductor manufacturers such as Signetics, Intel and AMD.

The control unit 110 generates and stores security code data and also generates a pseudo-random data list having, for example, a group of 50 data values which correspond to a set of 50 random channels from 173 possible channels available in the 902–928 MHz frequency band in accordance with the Federal Communication Commission's General Docket No. 89-354. The security code data is generated while the handset unit 20 is in a mating cradle in the base unit 10 and is provided to the handset unit 20 in accordance with the teachings of U.S. Pat. No. 4,736,404 issued to R. E. Anglikowski, et al. on Apr. 5, 1988. The security code data stored in control unit 110 is transmitted between the base unit 10 and the handset unit 20 via a battery charge contact interface formed by contacts 103 and 104 located on the base unit which interface with contacts 201 and 202 located on the handset unit 20. The security code, provided during an initialization process described later herein, is transmitted while establishing initial communications or call set-up during the time that the handset unit 20 is located remote from the base unit 10 as well as during the transfer of subsequent opcode data between these units during ongoing communications.

Like the security code data, the pseudo-randomly generated data list is generated when the handset unit 20 is in the mating cradle in the base unit 10. In accordance with the invention, the control unit 110 generates an expanded pseudo-random data list including, for example, a 51st and 52nd data value in the group of data values which corresponds to a set of two in the 173 possible channels available in the 902–928 MHz frequency band. Also like the security code data, this set of channels is used during the initialization process described in greater detail later herein. It will become apparent to those skilled in the art that the pseudo-randomly generated data list could alternatively be implemented in the handset unit 20 without departing from the spirit and scope of this invention. The data list, which includes data for this set of channels, also is transmitted between the base unit 10 and the handset unit 20 via the battery charge contact interface during the initialization process. This pseudo-randomly generated data list may be generated in accordance with the teaching of S. W. Golomb in *Digital Communications With Space Applications* (New Jersey: Prentice-Hall 1964) pp. 7–15.

This control unit 110 also controls and configures the TDD 120. The pseudo-randomly generated data list from the control unit 110 is provided to the TDD where it is stored therein. The TDD 120, in turn, controls the frequencies selected in the frequency hopping cycle of the base unit 10 by inputting into the frequency synthesizer 150 at the appropriate time the values stored in the data list generated by the control unit 110. The TDD 120 also refreshes the frequency synthesizer 150 as the synthesizer progresses though the frequency hopping cycle.

Referring next to the handset unit 20, components in this unit include a control unit 210, a wake-up timer 212, and a clock 215 for providing synchronization to: 1) the control unit 210, 2) a time domain duplexer (TDD) 220, and 3) a combined digital-to-analog and analog-to-digital (D/A+A/D) converter 225. Also included in the handset unit 20 are an RF transceiver 230, an antenna 240 and a frequency synthesizer 250. A telephone circuit and keypad section 260 permits dialing telephone digits and selecting such functions as talk, intercom and page modes for the handset unit 20 to communicate with the base unit 10. A battery 270 provides operating power for all the circuitry in the handset unit 20. This battery is charged by the power circuit 170 via the charge contact interface 103, 104 and 201,202 formed when the handset unit 20 is placed in the mating cradle of the base unit 10.

The transceiver 230 comprises both an RF transmitter and an RF receiver. This transceiver 230 demodulates voice signals transmitted by the base unit 10 and couples these signals via the D/A section of converter 225 and a hybrid 283 on to a loudspeaker 281. The transceiver 230 also has as its input analog speech signals from a microphone 282 which it transmits to the base unit 10. These analog speech signals are coupled to the transceiver via the hybrid 283 and the A/D section of converter 225. This converter converts the analog signal to a digital signal which is then provided to the RF transceiver 230. Conventional amplifiers 284 and 285 are employed for respectively amplifying the analog speech signals obtained from the microphone 282 and provided to the loudspeaker 281.

The initialization process that configures the handset unit 20 for communicating with the base unit 10 takes place when the handset unit is placed in the mating cradle of the base unit 10. Included in the telephone circuit and keypad section 260 is an in-cradle detector (not shown) for detecting when the handset unit is inserted in the mating cradle on the base unit. This in-cradle detector also signals the control unit 210 whenever the handset unit 20 is inserted in the cradle. During the initialization process, the control unit 210 interfaces with and communicates with the control unit 110 in the base unit 10. As a part of this communication, the control unit 210 receives the pseudo-randomly generated data list and the security code data from the control unit 110 over the charge contact interface 103, 104 and 201,202. Once this data has been received, the control unit 210 acknowledges receipt of the data by echoing this same data back to the base unit 10 via the charge contact interface.

Any communications between the base unit 10 and the handset unit 20 must be accompanied by the security code then shared between them. During the establishing of initial communications between the handset unit 20 and the base unit 10 initiated by the base unit 10, the control unit 210 must be able to make a favorable comparison of the received security code data with its stored security code data. Similarly, a favorable comparison of the data from the two security codes also must be made by control unit 110 in order for the base unit 10 to respond to a call set-up request from a handset unit. Like the control unit 110, the control unit 210 may be implemented through the use of a microcomputer containing ROM, RAM and through use of the proper coding. Such a microcomputer is known in the art and is readily available from semiconductor manufacturers such as Signetics, Intel and AMD.

While the handset unit 20 is not being used for communications and is located remote from the base unit 10, the handset unit 10 enters a low-power monitoring mode which includes powering down and then powering up certain minimum circuitry in the handset unit 20 as necessary for satisfactory operation. Reducing the on-time state of this circuitry aids in conserving battery power when no communications are in progress between the handset unit and the base unit. Also, other circuitry in the handset unit 20 is turned completely off while the handset unit is in this monitoring mode. In powering down the handset 20, the control unit 210 turns itself off or puts itself to sleep and signals the TDD 220 also to turn off while in the powered down state. Before turning off, the TDD 220 activates wake-up timer 212, which comprises, for example, a one-shot-monostable multivibrator, and turns off all other clock-driven circuitry in the handset unit 20. After approximately 360 milliseconds, the handset 20 is powered up into a minimum power operating state for 40 milliseconds. This change of state is initiated by a pulse provided to the TDD 220 from wake-up timer 212 at the end of the 360 milliseconds. The TDD 220 is enabled thereby and, in turn, turns on the control unit 210, the clock 215, and the receiver portion of the transceiver 230 for determining if an RF signal is being transmitted from the base unit or if a key has been pushed on the keypad in the handset unit 20. If neither of these has occurred, the control unit 210 again turns off power to itself and to the TDD 220, and the cycle is repeated. This low-power monitoring mode continues as long as an RF signal is not received from the base unit or a key is not pushed on the keypad.

When an RF signal is received from a base unit, this signal is coupled to the control unit 210 which looks for an initialization synchronization (sync) pattern in the signal within the 40 milliseconds that the handset unit is powered up to its minimum power operating state. If the received initialization sync pattern does not contain the security code that is recognized by the handset unit, the control unit 210 turns off power to itself and to the TDD 220. If the initialization sync pattern does contains the security code that is recognized by the handset unit, however, the control unit 210 causes the low-power monitoring mode to be overridden. In so doing, the control unit 210 continues to enable the TDD 220 beyond its normal ON time in order to establish synchronization with the RF signal being received from the base unit. The low-power monitoring mode of the handset unit 20 also is overridden by certain key pushes on the keypad as well as when the handset unit is placed into the mating cradle in the base unit 10 so that an exchange of data between the handset unit and base unit can take place through the battery charge contact interface then existing them between.

Communications between the base unit and the handset unit occur in time periods designated as transmission frames. In a frame, the base unit and the handset unit both transmit to each other. A typical transmission frame may be, for example, 5 milliseconds in length and contain time slots for approximately 500 bits of information. In operation, the base unit generally transmits in the first half of each frame or for 2.5 milliseconds and is then reconfigured to receive a signal from the handset unit which transmits in the second half of each frame or for 2.5 milliseconds on the same frequency. The handset unit operates in complementary fashion to the base unit in that it receives in the first half of each frame and is reconfigured to transmit in the second half of each frame. This cyclic frame transmission generates 80 frames in approximately 400 milliseconds.

Both the base unit and the handset unit may initiate a call to each other. As earlier indicated, channels 50 and 51 are the set of channels used for initiating communications between the base and handset units. When the base unit is initiating a call to the handset unit, the base unit sends the initialization synchronization pattern on channel 51 in the first part of each frame for 400 milliseconds. When the handset unit is initiating a call to the base unit, the handset unit also sends this same initialization synchronization pattern on channel 51 but in time periods equal to the second part of each frame for 120 milliseconds. This synchronization pattern comprises a dotting sequence signal, followed by a security code, a barker code and a period in which no information is transmitted as discussed later herein.

The dotting sequence signal is a series of ones and zeros that are provided for enabling the handset unit, and also the base unit as later shown herein, to align the phase of its receive clock with the phase of the clock providing the incoming signal. When the phase of these clocks is aligned, the handset unit is then able to read in the proper bit boundary the security code and barker code that follow the dotting sequence signal.

When attempting to contact the handset unit, the base unit sends 198 bits of the dotting sequence signal followed by the security code. This security code is a 16-bit random number generated by the base unit and, as earlier indicated, is transferred to the control unit 210 in the handset unit 20 over the battery charge contacts while the handset unit is in the cradle of the base unit 10. This shared security code guards against another base unit inadvertently synchronizing with this handset unit. Also, during ongoing communications, the base unit and handset unit are able to determine if any channel, over which they are then communicating, is being interfered with by assessing the number of security code bits that are received incorrectly while on this channel.

The security code is followed in the initialization synchronization pattern by the barker code. This barker code is a fixed predetermined eight-bit pattern which provides a position reference in a frame for aligning a frame clock of the receiver in the handset unit with the frame clock of the transmitter in the base unit. This permits the handset unit to re-establish frame sync or frame phase with the base unit after the handset unit has been turned off during its low-power monitoring mode of operation. When aligning with the handset unit, a frame clock in the receiver of the base unit must similarly be aligned with a frame clock of the transmitter in the handset unit.

After the base unit transmits the security code and barker code in the initialization sync pattern, no additional information is sent by the base unit in each frame for a time period equal to 30 bits. A delay is provided in this time period for certain internal processing to occur, including, for example, the reconfiguring of the frequency synthesizer 150 for receiving the initialization sync pattern from the handset unit.

Once the alignment of the frame position of the handset unit receiver with the base unit transmitter has been achieved, synchronization or "BIG SYNC" for the handset unit is established. Similarly, the alignment of the frame position of the base unit receiver with the handset unit transmitter also establishes BIG SYNC for the base unit.

Figure 2:
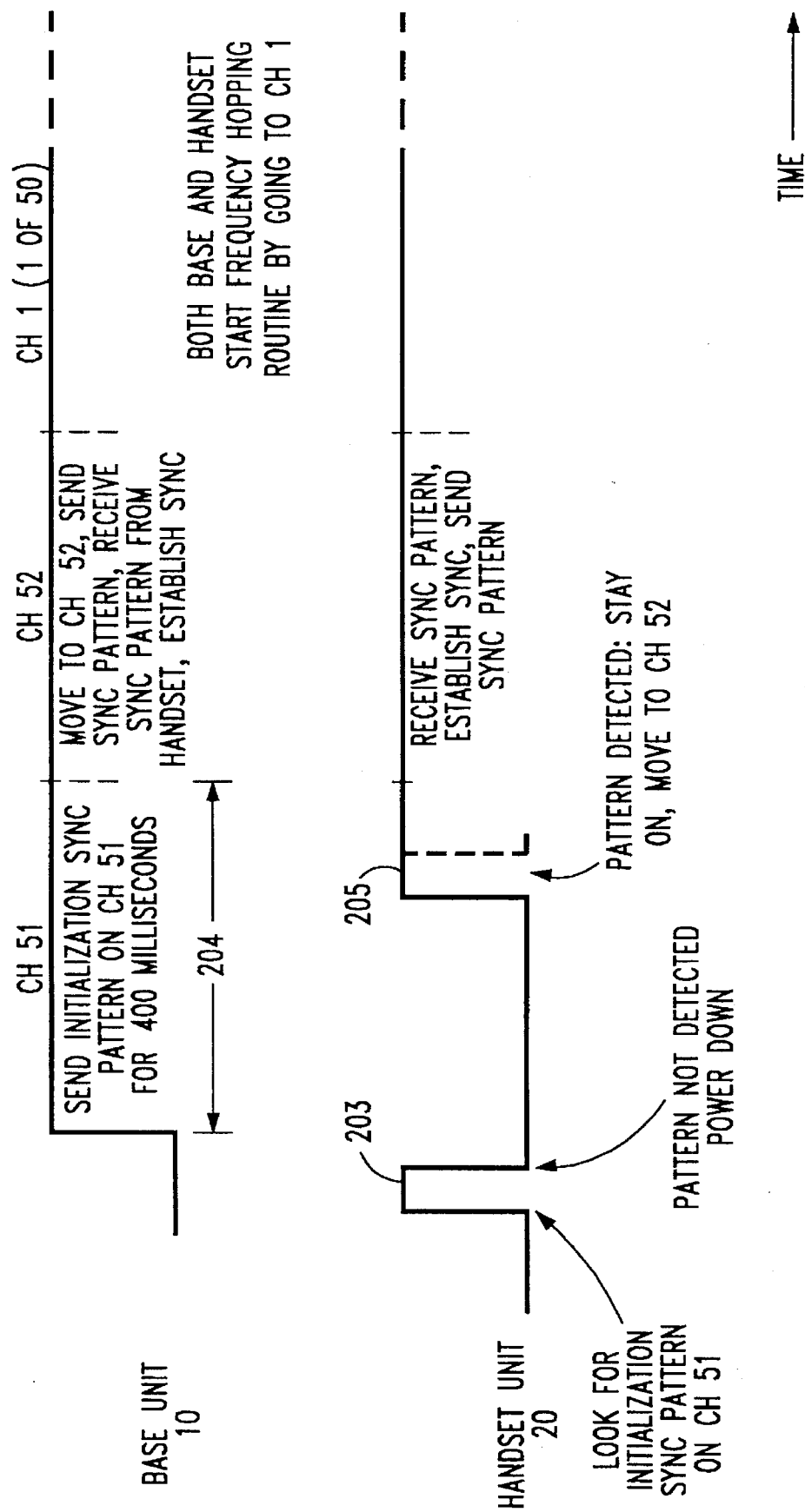
FIG. 2 is a timing diagram for illustrating the low-power monitoring mode of the cordless telephone system in accordance with the invention.

Referring next to FIG. 2, there is shown the timing diagram for illustrating the operation of the cordless telephone system in providing a low-power monitoring mode of operation for the handset unit. The general timing for transmission of an initialization sync pattern from the base unit 10 is shown in the upper portion of this figure, and the timing for activation of the handset unit for receipt of this synchronization pattern is shown in the lower portion of this figure. The timing diagram also shows the interaction of the base unit in activating the handset unit to a full ON operating condition from the minimum power operating state.

Whenever the base unit desires to contact the handset unit, it sends the initialization sync pattern for time period 204 or 400 milliseconds as described earlier herein. As illustrated in the timing diagram, the handset receiver is initially in the OFF state then turned on for a time period 203 on channel 51 for approximately 40 milliseconds. At time period 203, the handset unit listens for the initialization sync pattern from the base unit 10 which is not detected. The handset unit is then powered down for 360 milliseconds. At the end of this 360 millisecond time period, the handset is turned on again at time period 205 and this time it does detect the initialization sync pattern being transmitted on channel 51 by the base unit 10. In order to insure that each transmitted sync pattern is detected, the length of the powered-down period for the handset unit receiver is designed such that the sync pattern will bridge across two powered-up periods.

In the 40 milliseconds that it is turned on, the handset unit will receive the sync pattern being transmitted from the base and thereby acquire BIG SYNC from the base unit on channel 51. Once the handset receives BIG SYNC, it moves immediately to channel 52 and waits for the base unit to also move to this channel and send the initialization sync pattern. Once the base unit transmits the initialization sync pattern on channel 51 for 400 milliseconds, it moves to channel 52 and continues sending this sync pattern on this channel. Since the handset unit has begun to monitor channel 52, the handset unit also will acquire BIG SYNC on this channel. Once BIG SYNC is acquired by the handset unit, it begins to transmit the initialization sync pattern back to the base unit on channel 52 so that the base unit also may align the phase clock for its receiver to the phase clock for the handset unit transmitter. The initialization sync pattern transmitted by the handset unit to the base unit in channel 52 is identical to that sent by the base unit to the handset unit in channels 51 and 52.

When the handset unit initiates the call to the base unit, the handset unit sends the initialization sync pattern to the base unit on channel 51 for approximately 120 milliseconds. After this period, it returns to its listening mode on channel 51. If the base received the sync pattern from the handset unit, the base takes over the call setup and the process described above is executed.

During the time that the base unit and handset unit are on channel 52, these units must synchronize as to when to start the hopping sequence. Thus, once the base unit acquires BIG SYNC from the handset unit, it stops sending the initialization sync pattern, sends an 8-bit opcode to the handset unit informing it to stop sending the initialization sync pattern, and also starts sending the first in a series of opcodes defining when it and the handset unit are to begin frequency hopping. This message transmission format is shown in FIG. 5 and described later herein with reference to this figure.

Figure 3:
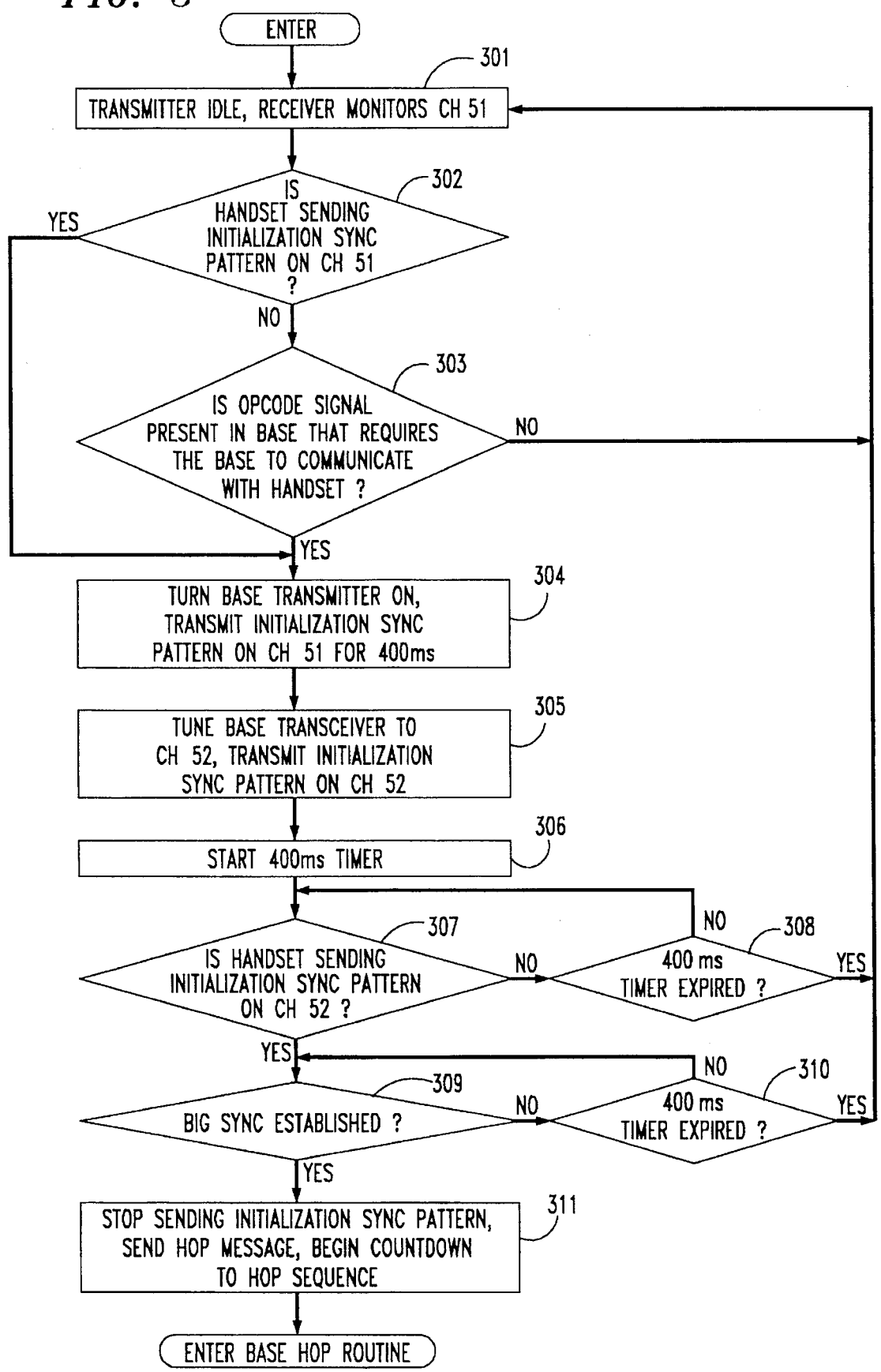
FIG. 3 is a flow diagram of a process suitable for incorporation into the base unit of the cordless telephone shown in FIG. 1 in accordance with the invention.

Referring next to FIG. 3, there is shown a flow chart illustrating the operation of the cordless telephone with the desired functionality including criterion for the base unit in initiating a call set-up with the handset unit. The functions provided by control unit 110 are advantageously determined by a process or program stored in read-only memory (not shown). The process is entered at step 301 where the transmitter in the base unit is idle and the receiver in the base unit is monitoring channel 51 for a signal from the handset unit. The process next advances to decision 302 where it is determined if the handset unit is sending an initialization sync pattern on channel 51. If the handset unit is not sending this pattern on channel 51, the process advances to decision 303 where a determination is made as to whether an opcode signal is present in the base unit that requires the base unit to communicate with the handset unit. Examples of such a signal would be an incoming ringing signal over the tipand-ring lines and also a signal failure opcode described in greater detail later herein. If such a signal is not present, then the process returns to step 301. This loop is repeated while the base unit is in the standby state monitoring channel 51 for a call from the handset unit.

When the handset unit is sending an initializing sync pattern on channel 51 as determined by decision 302, the process advances to step 304. Also, when an opcode signal is present in the base unit that requires the base unit to communicate with the handset unit, the process similarly advances from decision 303 to step 304. At this step 304, the base unit transmitter is turned on and the initialization sync pattern is transmitted on channel 51 for 400 milliseconds. From step 304, the process advances to step 305 wherein the base transceiver (transmitter and receiver) is tuned to channel 52. The transmitter again transmits the initialization sync pattern on this channel and the receiver begins to monitor this channel for receipt of the initialization sync pattern expected to be provided by the handset unit on this channel.

From step 305, the process advances to step 306 where a 400 millisecond timer is started. The process then advances to decision 307 where a determination is made as to whether the handset unit is sending the initialization sync pattern as expected on channel 52. If this sync pattern is not being received, the process advances to decision 308 where a determination is made as to whether the 400-millisecond timer has expired. If this timer has expired, the attempt to establish communications with the handset unit is terminated and the process returns to the step 301 where it again monitors channel 51. If the timer has not expired in decision 308, the process returns to decision 307 and continues to look for the initialization sync pattern on channel 52. If in decision 307, it is found that the handset unit is sending its initialization sync pattern on channel 52, the process advances to decision 309.

At decision 309, a determination is made as to whether BIG SYNC is established in the base unit. If not, the process advances to decision 310 where the 400-millisecond timer is examined once again. If this timer has expired, the process returns to step 301 and the call set-up attempt is discontinued. If the timer has not expired, the process returns to decision 309 and determines once again whether BIG SYNC has been established. When BIG SYNC is established, the process advances to step 311 where the base unit stops sending its initialization sync pattern and sends a message to the handset unit to cause it to also stop sending its sync pattern. The base unit also sends the hop message to the handset unit in this step and begins its countdown to the time at which the frequency hopping sequence is to start. Once the countdown sequence ends, the call setup routine is exited and the process enters the base hop routine.

Figure 4:
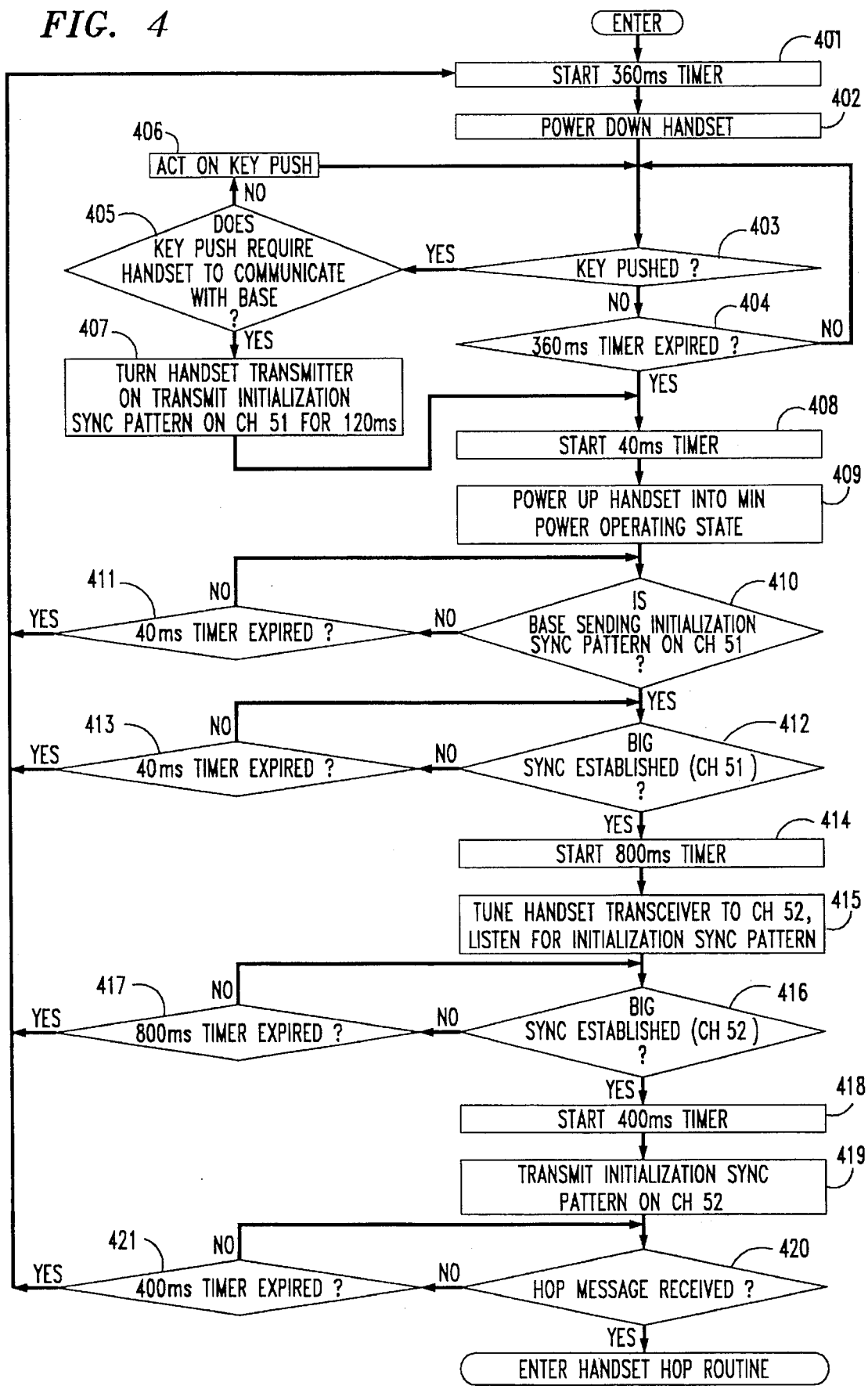
FIG. 4 is a flow diagram of a process suitable for incorporation into the handset unit of the cordless telephone shown in FIG. 1 in accordance with the invention.

Referring next to FIG. 4, there is shown a flow chart illustrating the operation of the cordless telephone with the desired functionality including criterion for operation of the handset unit in the low-power monitoring mode. The functions provided by control unit 210 are advantageously determined by a process or program stored in read-only memory (not shown). The low-power monitoring mode is applicable when the handset unit is located remote from the base unit and not then communicating with the base unit. Certain circuitry in the handset unit is turned completely off while the handset unit is in this monitoring mode. Other circuitry in the handset unit is powered down and then back up as necessary for satisfactory operation.

The process is entered at step 401 where the wake-up timer, which expires or times-out in 360 milliseconds, is started. The process then advances to step 402 where all other nonessential circuitry in the handset unit is turned off. The process next advances to decision 403 where a determination is made as to whether a key on the handset unit keypad has been pushed. If not, the process advances to decision 404 where it determines whether the wake-up timer has expired. If this timer has not expired, the process returns to decision 403 and continues in this loop until either the timer expires or a key is pushed on the handset unit keypad.

If a key is determined to have been pushed in decision 403, specific circuitry in the handset unit, which monitors this function, determines in decision 405 whether the key push requires the handset unit to communicate with the base unit. If the key push does not require the handset unit to communicate with the base unit, the circuitry acts on the key push in step 406 and the process returns to decision 403 where it determines once again if a key has been pushed. If at decision 405, however, it is determined that the key push requires the handset unit to communicate with the base unit, the process advances to step 407 where the handset unit transmitter is turned on and the initialization sync pattern transmitted on channel 51 for 120 milliseconds. The process then advances to step 408 where a 40-millisecond timer is started. The process similarly advances to this step 408 from decision 404 once it has been determined that the wake-up timer has expired.

From step 408, the process advances to step 409 where the handset unit is powered up into its minimum power operating state. In this state, the receiver and other minimum circuitry in the handset unit, necessary for determining if an RF signal is being transmitted by the base unit, are turned on. From step 409, the process advances to decision 410 where it is determined whether the base unit is sending the initialization sync pattern on channel 51. If not, the process advances to decision 411 where it is determined if the 40-millisecond timer has expired. If this timer has expired, the handset unit has not received the RF signal from the base unit and the process returns to the step 401. If the 40-millisecond timer has not expired, the process returns to decision 410 and continues to look for the sync pattern on channel 51.

If the handset unit has determined in decision 410 that the base unit is sending the initialization sync pattern on channel 51, then the process advances to decision 412 where a determination is made as to whether the handset unit has acquired BIG SYNC on channel 51. If not, the process advances to decision 413 where it is determined if the 40-millisecond timer has expired. If this timer has expired, the handset unit has not received BIG SYNC in the allotted time from the base unit and the process returns to step 401. If the 40-millisecond timer has not expired, the process returns to decision 412 and continues to look for BIG SYNC on channel 51.

Once BIG SYNC is acquired on channel 51, as reflected in decision 412, the process advances to step 414 where an 800-millisecond timer is started. From this step, the process then advances to step 415 where the transceiver, i.e., the transmitter and the receiver, is tuned to channel 52 where the receiver begins to listen for the initialization sync pattern. From decision 415, the process advances to decision 416 where it is determined whether BIG SYNC has been acquired by the handset unit on channel 52. If not, the process advances to decision 417 where it is determined if the 800-millisecond timer has expired. If this timer has expired, the handset unit has not acquired BIG SYNC in the allotted time from the base unit and the process returns to the step 401. If the 800-millisecond timer has not expired, the process returns to decision 416 and continues to look for BIG SYNC on channel 52.

If BIG SYNC is acquired on channel 52, the process advances from decision 416 to step 418 where a 400-millisecond timer is started. Next the process advances to step 419 where the transmitter in the handset unit begins to transmit its initialization sync pattern to the base unit on channel 52. The base unit will receive this initialization sync pattern from the handset unit, as earlier described herein with regard to the process in FIG. 3, and send a hop message to the handset unit.

From the step 419, the process advances to decision 420 where the handset unit determines whether the hop message has arrived. If not, the process advances to decision 421 where it is determined if the 400-millisecond timer has expired. If this timer has expired, the handset unit has not received the hop message in the allotted time from the base unit and the process returns to the step 401. If the 400-millisecond timer has not expired, the process returns to decision 420 and continues to look for the hop message. Once the hop message has been received, as reflected in decision 420, the handset unit begins its countdown sequence to the time at which the frequency hopping sequence is to start. When the countdown sequence ends, the routine for the low-power monitoring mode is exited and the process enters the handset unit hop routine.

The desired functionality is provided to the cordless telephone, in accordance with the invention, through the processes of FIGS. 3 and 4 also in reestablishing an interrupted telephone call. The processes described in the flow diagrams of FIGS. 3 and 4 advantageously permit quick reestablishing of communications between the base unit and the handset unit should there be an inadvertent interruption of communications between these units. An interruption may occur in a number of ways. By way of example, as the user of the handset unit moves about, he or she could inadvertently wander outside the communication range of the cordless telephone while engaged in a conversation over the cordless telephone handset unit. The handset or base unit may shortly thereafter lose BIG SYNC. Also, certain channels over which the base unit and handset unit are assigned to hop among may become so noisy (either to the base unit, the handset unit or both of these units) such that communications may be affected when one or more of these channels are encountered. Thus, should the handset unit lose BIG SYNC with the base unit or the base unit lose BIG SYNC with the handset unit while communicating, the unit that first loses BIG SYNC will stop its frequency hopping and go to channel 51. The second unit, since it will no longer receive a signal from the first unit, will detect the absence of this signal and also immediately go to channel 51. Once the base unit arrives on channel 51, it immediately starts sending an initialization sync pattern to the handset unit in accordance with a signal failure opcode as is provided by the routine of FIG. 3, specifically decision 303. When the handset unit arrives on channel 51, it listens for this initialization sync pattern from the base unit. In accordance with the routines described in both FIG. 3 and FIG. 4, BIG SYNC is reacquired, the respective hop routines are entered, and communications is thereby reestablished in the handset and base units.

Referring now to FIG. 5, there is shown, in accordance with the disclosed embodiment, a hopping message transmission format usable for synchronizing the start of the frequency hopping sequence shared by both the base unit 10 and the handset unit 20. The hopping message transmission format is readily usable in the cordless telephone described in U.S. Pat. No. 6,353,341 which issued on Oct. 4, 1994, for acquiring synchronization between the base unit and the handset unit described therein. In acquiring synchronization, as described in U.S. Pat. No. 5,353,341, only after a start hopping message is received by the handset unit is an "ACK" message transmitted back to the base unit. Similarly, only after the "ACK" message is received in the base unit is the "ACK 2" message transmitted back to the handset unit. Thus, in this disclosed hopping message transmission format, the sending and receiving of the start hopping message, the ACK message and the ACK 2 message are each sequentially executed, one after the other. Although suitable synchronization between the base unit and the handset unit are obtained, both the base unit and handset unit are required to wait typically 6 to 8 frames before the receive acknowledgment is provided from the other unit. Thus, neither the handset unit nor the base unit efficiently use its processing time since each is required to wait for the acknowledge message before proceeding with further processing for synchronizing the frequency hopping sequence.

With reference once again to the hopping message transmission format disclosed herein and illustrated in FIG. 5, synchronization between the base unit and the handset unit is achieved by having the base unit first send a start hopping message or opcode contiguously for a specific number of frames, or time slots, typically eight, without waiting for the handset unit to respond to the start hopping message. The base unit then contiguously sends an acknowledge hopping message to the handset unit, also typically for eight frames, if an acknowledge message from the handset is received in the specific time slot. In general, upon receipt of the last acknowledge hopping message by the handset unit from the base unit, both the base unit and the handset unit begin frequency hopping.

Each start hopping message, in each of its eight frames, and also each acknowledge hopping message, in each of its eight frames, have different opcodes which linearly decrease in value by a hexadecimal value of one. In both the start hopping message and the acknowledge hopping message provided by the base unit, the base unit thus counts down to specific hexadecimal numbers which are received by the handset unit. By way of example, the base unit starts by transmitting hexadecimal 8F ($8F) in the first half of the first frame, or time slot, of the start hopping message, shown in FIG. 5 as frame 501, and counts down to and transmits hexadecimal 88 ($88) in the first half of the eighth frame of the start hopping message. This frame is illustratively shown as frame 502. The base unit then sends hexadecimal 7F ($7F) in the first half of the first frame 503 for the acknowledge hopping message and counts down to and sends hexadecimal 78 ($78) in the first half of the eighth frame 505 of the acknowledge hopping message if it receives the corresponding acknowledge message from the handset.

While the base unit is sending its start hopping message to the handset unit in the first half of the specified number of frames, the handset unit, in turn, upon receipt of each message in each frame, responds to the base unit by acknowledging each start hopping message in the second half of frames delayed by an inherent processing delay in the handset unit. Although the start hopping message, e.g., ($8F) is received in the handset unit in the same frame in which it is transmitted, it is not received and decoded in the control unit 210 until typically four frames later. It is also typically not transmitted back to the base unit until four additional frames later, as shown in the second half of frame 502, which reflects that the sending of the acknowledge hopping message ($8F) by the handset is eight frames after the sending of the start hopping message ($8F) by the base unit, causing a total delay of eight frames, in this example. This delay is due to the processing delay of between three and four frames required to send messages between the time domain duplexer 220 and the control unit 210. The processing delay results when data between the duplexer 220 and the control unit 210 is exchanged on each frame alignment cycle which is, like the time slot for a frame, 5 milliseconds in length. A similar processing delay is experienced between the time domain duplexer 120 and the control unit 110 in the base unit. This processing delay is described in detail in U.S. Pat. No. 5,381,475 issued on Jan. 10, 1995 this being incorporated herein by reference.

Once the control unit 210 receives the first start hopping message ($8F), it sends an acknowledge hopping message ($8F), essentially the same message that it receives, back to the base unit. This transmission is illustratively shown in the second half of frame 502. Receipt of this acknowledge message establishes a subsequently designated frame, after a specific time delay, in which the base unit then expects to receive each subsequent acknowledge message that it transmits to the handset unit while in this synchronization process. This also advantageously permits the base unit to continue in and not abort the synchronization process if for some reason it happens to not receive a subsequent acknowledge message in an expected designated frame.

After the base unit sends the first start hopping message, it tentatively expects the handset unit to send back the same message within one of a few received frames, typically six to eight frames later. If, due to interference or some other reason, the base unit does not receive an acknowledge hopping message from the handset unit within an expected designated frame, it simply advances to the next frame and looks for an acknowledge hopping message in that frame.

If the base unit receives an initial acknowledge hopping message in a frame other than as expected, it simply adjusts (either increasing or decreasing) its specific time delay to that corresponding to the message received in this frame, advances to the next frame and looks for the next acknowledge hopping message it expects to receive (after the adjustment) in this next frame. Each time the base unit does not receive an acknowledge hopping message from the handset unit in a time frame, it does not send its own acknowledge hopping message to the handset unit in the subsequently designated frame (even if a designated frame already exists for the message during the time that this message was not received from the handset unit). If the base unit does not receive an acknowledge hopping message from the handset unit after eight frames, the base unit aborts the synchronization process. If the base unit successfully receives at least one acknowledge hopping message from the handset unit within the eight frames, it then sends its acknowledge hopping message to the handset unit in its subsequently designated time frame.

After receipt of the last acknowledge hopping message ($88), as shown in frame 504, from the handset unit (or the time for receipt of this message passes without the message being received and another acknowledge message with a higher count was earlier satisfactorily received), the base unit finishes its countdown to the acknowledge hopping message ($78) by transmitting this message if it has not already done so as a result of synchronizing upon a different designated frame. The base unit next delays beginning its frequency hopping by a number of frames 506, typically three, to compensate for the aforementioned delay in the handset unit in receiving and processing in the control unit 210 the last acknowledge hopping message ($78) from the base unit. After this delay, the base unit moves to channel 1 and starts frequency hopping.

Before the handset unit can start its frequency hopping, it, like the base unit, has to receive at least one acknowledge hopping message from the base unit in a designated frame that it expects the base unit to send such acknowledge hopping message. Without the receipt of one such acknowledge hopping message, the synchronization process is aborted in the handset unit. If the handset unit does not receive an acknowledge hopping message in its designated frame, the synchronization process continues and the handset unit simply advances to the next frame and looks for the acknowledge hopping message it expects to receive in this next frame. Similarly, if an acknowledge hopping message is not received by the handset unit in either of multiple frames, the process continues to advance until the handset unit receives an acknowledge hopping message in a designated frame in which it expects to receive such message. If the process had advanced to the eighth frame and the handset unit has not received an acknowledge hopping message, the process is aborted. After the handset unit receives in its control unit and processes the last acknowledge hopping message ($78) from the base unit (or the designated frame for this message is reached without the message being received and at least one other acknowledge hopping message was received in its designated frame as expected), the handset unit moves to channel 1 and begins synchronously frequency hopping with the base unit.

Various other modifications of this invention are contemplated and obviously may be resorted to by those skilled in the art without departing from the spirit and scope of the invention. By way of example, each start hopping message and acknowledge hopping message generated by the base unit may have either more or less than eight frames associated with these messages and still operate in the manner intended. Furthermore, these messages alternatively may be generated in the handset unit and the base unit then synchronized with the handset unit. Also, the opcodes employed in the frames representing these messages may sequentially increase in value to a predetermined level, and at a rate other than as specifically described herein. These and other variations are fully embraced by the claims that follow.

I claim:

1. A cordless telephone system comprising:

a base unit and a handset unit arranged for communicating over any one of a plurality of communication channels in a frequency hopping system;

means for configuring said base unit and said handset unit on a selected one of the communication channels for beginning a synchronous frequency hopping cycle among the plurality of communication channels;

means in the base unit for transmitting contiguously a first series of data messages indicative of a start hopping message and a second series of data messages indicative of an acknowledge hopping message to the handset unit for synchronizing both the base unit and handset unit for said synchronous frequency hopping cycle; and means in the handset unit for transmitting a third series of data messages acknowledging receipt of each one of the first series of data messages from the handset unit, each message in the second series of data messages being given an assigned value and the data messages in the second series of data messages linearly decreasing in assigned value with time to a predetermined value after which both the base unit and handset unit begin the frequency hopping cycle.

2. The cordless telephone system of claim 1 wherein the base unit includes a first transmitter and a first receiver and the handset unit includes a second transmitter and a second receiver for respectively transmitting the third series of data messages to the first receiver and receiving both the first and second series of data messages from the first transmitter in the base unit over the selected one of the communication channels.

3. The cordless telephone system of claim 1 wherein the second series of data messages is transmitted contiguously after the first series of data messages.

4. The cordless telephone system of claim 3 wherein each message in the first series of data messages is given an assigned value and the data messages transmitted in the first series of data messages linearly decrease in assigned value with time to a predetermined value after which the data messages in the second series of data messages is transmitted.

5. The cordless telephone system of claim 4 wherein each data message in each one of the series of data messages is respectively transmitted in an associated time slot.

6. The cordless telephone system of claim 4 further including means in both the handset unit and base unit for detecting the value of each received data message in each time slot.

7. The cordless telephone system of claim 6 further including means in both the handset unit and base unit for detecting the absence of one or more data messages in respectively associated time slots, the handset unit and base unit respectively processing each data message received in a time slot and advancing from each time slot in which a data message is not received.

8. The cordless telephone system of claim 7 wherein the handset unit begins the frequency hopping cycle after receipt of at least one message in both the first and second series of data messages.

9. The cordless telephone system of claim 7 wherein the base unit begins the frequency hopping cycle after receipt of at least one message in the third series of data messages.

10. In a cordless telephone, a base unit arranged for communicating with a handset unit in a frequency hopping system, the base unit including a first transmitter and a first receiver for respectively transmitting to a second receiver and receiving from a second transmitter in the handset unit over any one of a plurality of communication channels, the base unit comprising:

means for configuring the first receiver on a selected one of the communication channels for beginning a synchronous frequency hopping cycle among the plurality of communication channels;

means for generating a first series of data messages indicative of a start hopping message and a second series of data messages indicative of an acknowledge hopping message; and means for transmitting contiguously the first series of data messages and the second series of data messages for synchronizing the handset unit with the base unit for said synchronous frequency hopping cycle, each message in the second series of data messages being given an assigned value and the data messages in the second series of data messages linearly decreasing in assigned value with time to a predetermined value after which both the base unit and handset unit begin the frequency hopping cycle.

11. The base unit of claim 10 further including means for receiving in the first receiver a third series of data messages from the handset unit, the third series of data messages acknowledging receipt of each one of the first series of data messages from the base unit.

12. The base unit of claim 11 wherein the second series of data messages is transmitted contiguously after the first series of data messages.

13. The base unit of claim 12 wherein the data messages transmitted in the first series of data messages linearly decrease in value with time to a predetermined value after which the data messages in the second series of data messages is transmitted.

14. The base unit of claim 13 wherein each data message in each one of the third series of data messages is respectively transmitted in an associated time slot.

15. The base unit of claim 14 further including means for detecting the value of each received data message in each time slot.

16. The base unit of claim 15 further including means for detecting the absence of one or more data messages in respectively associated time slots, the base unit processing each data message received in a time slot and advancing from each time slot in which a data message is not received.

17. The base unit of claim 16 wherein the base unit begins the frequency hopping cycle after receipt of at least one message in the third series of data messages.

18. In a cordless telephone, a handset unit arranged for communicating with a base unit in a frequency hopping system, the handset unit including a first transmitter and a first receiver for respectively transmitting to a second receiver and receiving from a second transmitter in the base unit over any one of a plurality of communication channels, the handset unit comprising:

means for configuring the first receiver on a selected one of the communication channels for beginning a synchronous frequency hopping cycle among the plurality of communication channels;

means for receiving contiguously in the first receiver a first series of data messages indicative of a start hopping message and a second series of data messages indicative of an acknowledge hopping message, the first and the second series of data messages synchronizing the handset unit with the base unit for said synchronous frequency hopping cycle; and means for transmitting contiguously a third series of data messages acknowledging receipt of each one of the first series of data messages, each message in the second series of data messages being given an assigned value and the data messages in the second series of data messages linearly decreasing in assigned value with time to a predetermined value after which both the base unit and handset unit begin the frequency hopping cycle.

19. The handset unit of claim 18 wherein the second series of data messages is received contiguously after the first series of data messages.

20. The handset unit of claim 19 wherein each message in the first series of data messages is given an assigned value and the data messages received in the first series of data messages linearly decrease in assigned value with time to a predetermined value after which the data messages in the second series of data messages is received.

21. The handset unit of claim 20 wherein each data message in each one of the third series of data messages is respectively transmitted in an associated time slot.

22. The handset unit of claim 21 further including means for detecting the value of each received data message in each time slot.

23. The handset unit of claim 22 further including means for detecting the absence of one or more data messages in respectively associated time slots, the handset unit processing each data message received in a time slot and advancing from each time slot in which a data message is not received.

24. The handset unit of claim 23 wherein the handset unit begins the frequency hopping cycle after receipt of at least one message in both the first and second series of data messages, the handset unit counting down to a predetermined value from the value contained in the received data message in said second series of data messages and beginning the frequency hopping cycle after reaching said predetermined value.

25. A method of initiating communications between a base unit and a handset unit of a cordless telephone employed in a frequency hopping system, the base unit including a first transmitter and a first receiver for respectively transmitting to a second receiver and receiving from a second transmitter in the handset unit over any one of a plurality of communication channels, the method comprising the steps of:

configuring the first receiver on a selected one of the communication channels for beginning a synchronous frequency hopping cycle among the plurality of communication channels;

generating a first series of data messages indicative of a start hopping message and a second series of data messages indicative of an acknowledge hopping message; and transmitting contiguously in the first transmitter the first series of data messages and the second series of data messages for synchronizing the handset unit with the base unit for said synchronous frequency hopping cycle, each message in the second series of data messages being given an assigned value and the data messages in the second series of data messages linearly decreasing in assigned value with time to a predetermined value after which both the base unit and handset unit begin the frequency hopping cycle.

26. The method of claim 25 further including the step of receiving in the first receiver a third series of data messages from the handset unit, the third series of data messages acknowledging receipt of each one of the first series of data messages from the base unit.

27. The method of claim 26 wherein the transmitting step further including the step of transmitting the second series of data messages contiguously after the first series of data messages.

28. The method of claim 27 wherein each message in the first series of data messages is given an assigned value and the data messages transmitted in the first series of data messages linearly decrease in assigned value with time to a predetermined value after which the data messages in the second series of data messages is transmitted.

29. The method of claim 28 wherein each data message in each one of the third series of data messages is respectively transmitted in an associated time slot.

30. The method of claim 29 further including the step of detecting the value of each received data message in each time slot.

31. The method of claim 30 further including the step of detecting the absence of one or more data messages in respectively associated time slots, the base unit processing each data message received in a time slot and advancing from each time slot in which a data message is not received.

32. The method of claim 31 wherein the base unit begins the frequency hopping cycle after receipt of at least one message in the third series of data messages.

33. A method of initiating communications between a base unit and a handset unit of a cordless telephone employed in a frequency hopping system, the handset unit including a first transmitter and a first receiver for respectively transmitting to a second receiver and receiving from a second transmitter in the base unit over any one of a plurality of communication channels, the method comprising the steps of:

configuring the first receiver on a selected one of the communication channels for beginning a synchronous frequency hopping cycle among the plurality of communication channels;

receiving contiguously in the first receiver a first series of data messages indicative of a start hopping message and a second series of data messages indicative of an acknowledge hopping message, the first and the second series of data messages synchronizing the handset unit with the base unit for said synchronous frequency hopping cycle; and transmitting contiguously from the first transmitter a third series of data messages acknowledging receipt of each one of the first series of data messages, each message in the second series of data messages being given an assigned value and the data messages in the second series of data messages linearly decreasing in assigned value with time to a predetermined value after which both the base unit and handset unit begin the frequency hopping cycle.

34. The method of claim 33 wherein the second series of data messages is received contiguously after the first series of data messages.

35. The method of claim 34 wherein each message in the first series of data messages is given an assigned value and the data messages received in the first series of data messages linearly decrease in assigned value with time to a predetermined value after which the data messages in the second series of data messages are received.

36. The method of claim 35 wherein the transmitting step further includes the step of transmitting each data message in each one of the third series of data messages in a respectively associated time slot.

37. The method of claim 36 further including the step of detecting the value of each received data message in each time slot.

38. The method of claim 37 further including the step of detecting the absence of one or more data messages in respectively associated time slots, the handset unit processing each data message received in a time slot and advancing from each time slot in which a data message is not received.

39. The method of claim 38 wherein the handset unit begins the frequency hopping cycle after receipt of at least one message in both the first and second series of data messages, the handset unit counting down to a predetermined value from the value contained in the received data message in said second series of data messages and beginning the frequency hopping cycle after reaching said predetermined value.

40. A cordless telephone system comprising:

a base unit and a handset unit arranged for communicating over any one of a plurality of communication channels in a frequency hopping system;

means for configuring said base unit and said handset unit on a selected one of the communication channels for beginning a synchronous frequency hopping cycle among the plurality of communication channels;

means in the base unit for transmitting contiguously a first series of data messages indicative of a start hopping message and a second series of data messages indicative of an acknowledge hopping message to the handset unit for synchronizing both the base unit and handset unit for said synchronous frequency hopping cycle; and means in the handset unit for transmitting a third series of data messages acknowledging receipt of each one of the first series of data messages from the handset unit, each message in the second series of data messages being given an assigned value and the data messages in the second series of data messages linearly advancing in assigned value with time to a predetermined value after which both the base unit and handset unit begin the frequency hopping cycle.

* * * * *